US008364615B2

(12) United States Patent
Andersen et al.

(10) Patent No.: US 8,364,615 B2
(45) Date of Patent: Jan. 29, 2013

(54) LOCAL GRAPH PARTITIONING USING EVOLVING SETS

(75) Inventors: Reid Marlow Andersen, Seattle, WA (US); Yuval Peres, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 12/367,404

(22) Filed: Feb. 6, 2009

(65) Prior Publication Data

US 2010/0205126 A1 Aug. 12, 2010

(51) Int. Cl.
*G06F 15/18* (2006.01)
*G06F 17/50* (2006.01)
*G06F 7/00* (2006.01)

(52) U.S. Cl. .......... 706/13; 716/129; 716/124; 707/798; 707/741; 707/738

(58) Field of Classification Search ................ None
See application file for complete search history.

(56) References Cited

U.S. PATENT DOCUMENTS

| | | | |
|---|---|---|---|
| 2006/0271564 | A1 | 11/2006 | Meng Muntz |
| 2007/0214135 | A1* | 9/2007 | Crivat et al. ............. 707/6 |
| 2007/0239694 | A1 | 10/2007 | Singh |
| 2008/0140358 | A1 | 6/2008 | Lang |
| 2008/0222726 | A1 | 9/2008 | Chayes |
| 2008/0275849 | A1 | 11/2008 | Basu |

OTHER PUBLICATIONS

Anderson et al., "Local Graph Partitioning using PageRank Vectors", 2006, Foundations of Computer Science, pp. 1-20.*
Anderson et al., "An Algorithm for Improving Graph Partitions", 2008, Society for Indrustrial and Applied Mathematics, pp. 651-660.*
Ioannis Koutis and Gary L. Miller, "Graph Partitioning into Isolated, High Conductance Clusters: Theory, Computation and Applications to Preconditioning", http://www.cs.cmu.edu/~jkoutis/papers/multiwayedge.pdf, Apr. 11, 2008, 16 pages.
Reid Andersen, et al., "Using PageRank to Locally Partition a Graph", http://research.microsoft.com/~reidan/papers/localpartfull.pdf, Dec. 20, 2006, 23 pages.
A Gupta, "Fast and Effective Algorithms for Graph Partitioning and Sparsematrix Ordering", http://www.research.ibm.com/journal/rd/411/gupta.pdf, IBM J. Res. Develop. vol. 41 No. 1/2 Jan./Mar. 1997, 13 pages.
Pekka Orponen and Satu Elisa Schaeffer, "Local Clustering of Large Graphs by Approximate Fiedler Vectors", http://www.tcs.hut.fi/~orponen/papers/fiedler.pdf, 8 Pages.

* cited by examiner

*Primary Examiner* — David R Vincent
*Assistant Examiner* — Paulinho E Smith
(74) *Attorney, Agent, or Firm* — Lee & Hayes, PLLC

(57) ABSTRACT

Providing for local graph partitioning using an evolving set process is disclosed herein. By way of example, a computer processor can be configured to execute local partitioning based on evolving set instructions. The instructions can be employed to transition a set of analyzed vertices of a graph until a segment of the graph with small conductance is identified. A transitioning algorithm can expand or contract the analyzed set of vertices based on characteristics of vertices at a boundary of the analyzed set. Accordingly, as the set of analyzed vertices becomes large, significant processing efficiency is gained by employing the characteristics of boundary vertices to transition the set or determine conductance, rather than all vertices of the analyzed set.

20 Claims, 10 Drawing Sheets

EXAMPLE VOLUME ANALYSIS — 504

EXAMPLE BOUNDARY ANALYSIS — 502

LOCAL GRAPH PARTITIONING USING EVOLVING SETS

BACKGROUND

It is well known that computers and computing technology have been a great contribution to the advancement of human civilization in the last several decades. Computer technology has enabled digital problem solving and data analysis much more rapidly than humans can typically perform manually. In addition, persistent electronic data exchange available through computer networking has revolutionized worldwide communication, enabling systems such as e-mail and Instant Messaging, as well as enabling communication infrastructure supporting the Internet and providing a backbone for the World Wide Web.

As computer networks grow and sub-net works of various flavors form within them, sophisticated analysis tools have developed in an effort to optimize performance and effectiveness of these networks. One example is graph partitioning analysis. In mathematics, graph partitioning involves analyzing a graph (comprising nodes or vertices and connections, or edges, between the vertices) and identifying portions of the graph that have few connections with other portions thereof. Certain assumptions about a portion of the graph having these qualities are often appropriate. For instance, depending on what structure the mathematical graph represents (see below), such a portion of the graph could represent discussions centered on a common topic of interest, communications between a group of friends, 'chat buddies' or business colleagues, parallel computing processes having common data dependencies, a set of web pages visited interconnected by a set of links, and so on.

A graph typically comprises a set of vertices (or nodes) and edges (interconnections between the vertices). One example of a graph can comprise a compiler network, where individual computers, servers, processors, mainframes, data stores, databases and so forth, comprise graph vertices, and communication links between the vertices comprise graph edges. In such an ex ample, graph partitioning can involve analyzing compiler access to a set of databases to map collisions in data usage. Such a map can be useful to plan parallel processing that minimizes such collisions, as a particular example.

As a mathematical entity, a graph can represent various practical structures (e.g., computer networks, social networks, inter-personal interactions, trend analysis, online search analysis, etc.). Furthermore, applications for graph analysis can be even more diverse than the numerous structures such graphs can represent. In general, however, graph partitioning follows a set of rules, based on identifying relatively isolated portions of the graph (having few external edges). Optimized graph partitioning often involves identifying these isolated portions when given a starting point within the graph. Meaningful interpretation of the analysis can typically be left to higher level structures (e.g., computer programs) that make certain assumptions about macroscopic systems represented by the graph, enabling the graph partitioning problem to be independent of those systems. Accordingly, graph partitioning algorithms can be applied often without significant modification for an under tying application, yielding a robust and diversified tool for solving many problems pertaining to macroscopic interactions.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for focal graph partitioning using an evolving set process. By way of example, a computer processor can be configured to execute local partitioning based on evolving set instructions. The instructions can be employed to transition a set of analyzed vertices of a graph until a segment of the graph with small conductance is identified. A transitioning algorithm can expand or contract the analyzed set of vertices based on characteristics of vertices at a boundary of the analyzed set. Accordingly, as the set of analyzed vertices becomes large, significant processing efficiency is gained by employing the characteristics of boundary vertices to transition the set rather than all vertices of the analyzed set.

According to other aspects of the subject disclosure, provided is local graph partitioning based on connectivity of boundary vertices of an analyzed set. The partitioning can transition the analyzed set to include external vertices, or shed internal vertices, based on connectivity of the boundary vertices. Vertex connectivity is based on a number of edges coupled with vertices inside the analyzed set. Thus, as an example, vertices with strong connectivity to the analyzed set can have higher probability of being included within the set, and vertices with weak connectivity to the analyzed set can have higher probability of being shed from the analyzed set. Accordingly, targeted partitioning based on boundary connectivity can increase likelihood of identifying a set of vertices with low conductance, or reduce time required to identify such a set, in many instances.

Further to the above, the subject disclosure provides a mechanism to provide targeted graph partitioning by coupling an evolving set process with a random walk. According to such aspects, an analyzed set of graph vertices is expanded or contracted based at least in part on a random walk. The random walk involves transitioning from a vertex of the analyzed set to an adjacent vertex, within our without the analyzed set. A subsequent state of the set expands or contracts to bound (or enclose) the adjacent vertex, based on a random or semi-random threshold that is conditioned on the adjacent vertex being included in the subsequent state. Where the vertex of the analyzed set has high internal connectivity, the set is less likely to expand; consequently, where the vertex of the analyzed set has high external connectivity, the set is more likely to expand. Accordingly, the analyzed set is likely to expand until boundary vertices have low external conductance, resulting in a successful analysis.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

Figure 1:
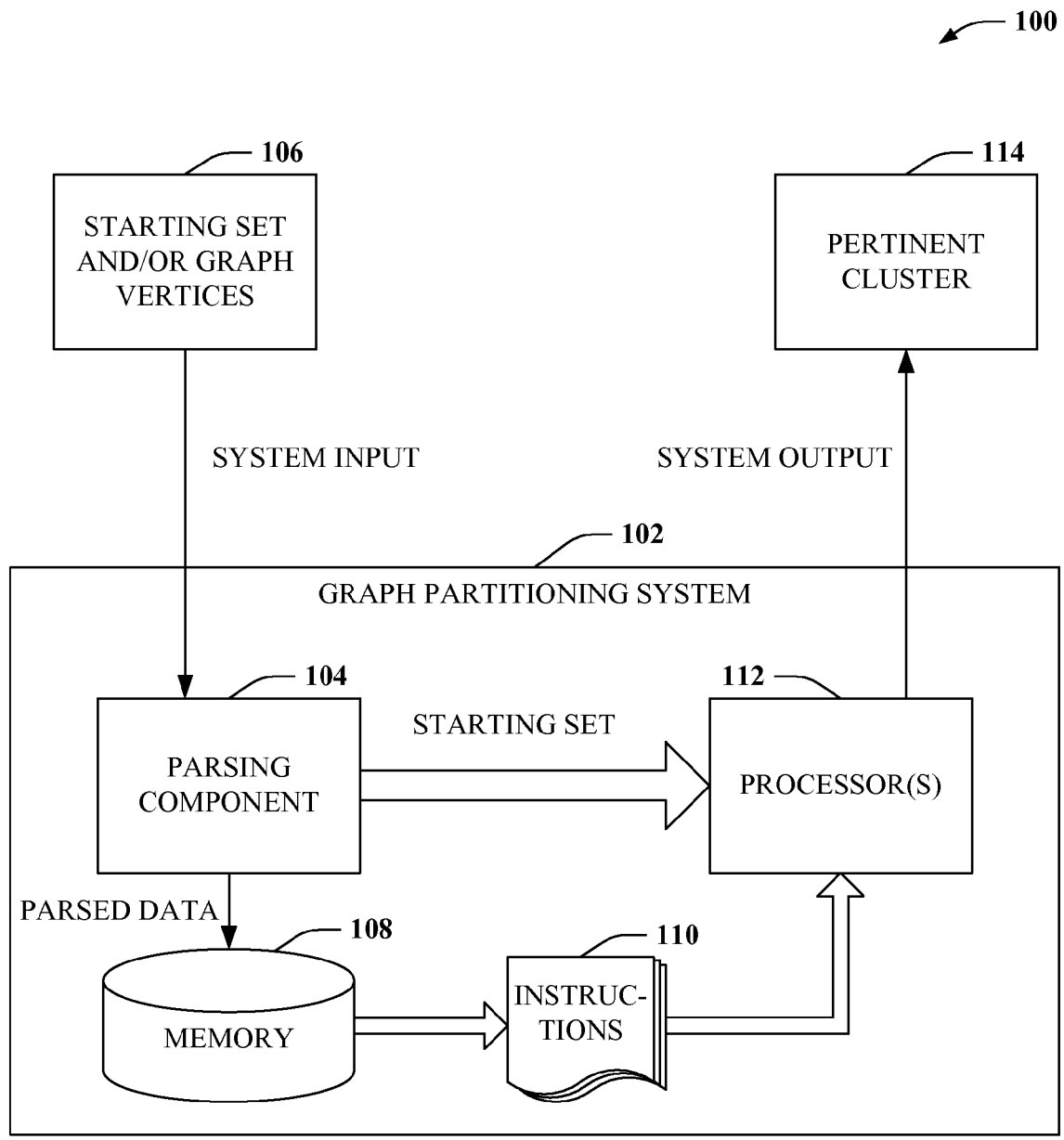
FIG. 1 depicts a block diagram of an example system for employing an evolving set process in targeted graph partitioning according to aspects disclosed herein.

Appendix A provides a set of presentation slides depicting local graph partitioning based on boundary analysis, according to additional aspects.

Appendix B provides a mathematical discussion and analysis of local graph partitioning employing evolving sets according to further aspects.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this disclosure, the terms "component," "module," "system", "interface", "engine", or the like are generally intended to refer to a computer-related entity, either hardware, a combination of hardware and software, software, or soft ware in execution. For example, a component may be, bit is not limited to being, a process running on a processor, a processor, an object, an executable, a thread of execution, a pro gram, and/or a computer. By way of illustration, both an application running on a controller and the controller can be a component. One or more components may reside within a process and/or thread of execution and a component can be localize don one computer and/or distributed between two or more computers. As another example, an interface can include I/O components as well as associated processor, application, and/or API components, and can be as simple as a command line or a more complex Integrated Development Environment (IDE).

Graph partitioning that compute segments of a graph having small conductance are fundamental tools in algorithmic design. Various types of graph partitioning exist, with algorithms centered upon global partitioning or local partitioning. Global partitioning takes a macroscopic view of a graph and analyzes an entire graph or large portions thereof to identify segments with small conductance. Local partitioning on the other hand employs an adaptive microscopic approach that begins by analyzing a starting vertex (or vertices) and expands outward from the starting vertex until a segment of the graph with small conductance is achieved. Such algorithms can be utilized for targeted graph clustering and as subroutines for solving other partitioning problems.

Running time for a local partitioning algorithm can be established in terms of a segment of the graph (or set of the graph) output by the algorithm. For instance, an algorithm can have time per volume ratio $r(\phi)$ if the running time of the algorithm is no greater than $r(\phi)$ times the volume of the set output by the graph. As utilized herein, volume of a set refers to a sum of all degrees of vertices in the set. Additionally, an algorithm has local approximation guarantee $f(\phi)$ if the algorithm outputs a set having conductance no greater than $f(\phi)$ when a cut (or segment) of the graph near a starting vertex has conductance no greater than $\phi$.

One goal of graph partitioning is to reduce the running time of an algorithm while improving the local approximation guarantee. Reduced running time results in more efficient use of computational processes, while improving the local approximation guarantee improves the quality of output results. One problem with graph partitioning especially when applied to very large graphs (e.g., graphs representing Internet network connections, traffic to popular websites, user selection of common search results, online communications of large groups of users, and so forth), is the increased running time, processor memory and processing resources required to analyze the vertices and edges of such graphs. As graphs become very large, both global and local partitioning algorithm scan become ineffective even when employing advanced modern computer processing. Thus, improvements in the under tying algorithms become attractive in order to further improve efficiency and reliability of graph partitioning considering finite processing power.

The subject disclosure provides for new approaches in computer-implemented graph partitioning to achieve increased efficiency, more robust performance, or both. In some aspects disclosed here in, provided is a local partitioning algorithm that employs an evolving set process for graph analysis. The evolving set process produces a sequence of subsets of a graph for analysis, $S\_0, S\_1, \ldots, S\_T$, which are called the states of the process. More particularly, the process states can be selected based on characteristics of vertices on a boundary of a current set. By employing boundary vertices, instead of all vertices of the current set for instance, processing associated with simulating the evolving set process can be greatly reduced. Accordingly, the subject disclosure provides for a significant increase in efficiency for graph partitioning. In at feast one aspect of the subject disclosure, disclosed algorithms provide a local approximation guarantee of $O(\sqrt{\phi \log n})$, where n is the number of vertices in an output set, and having time-per-volume ratio of $\tilde{O}(1/\sqrt{\phi})$.

According to one or more aspects of the subject disclosure, boundary vertices can be defined as vertices within a specified threshold distance from a vertex sharing an edge with an external vertex (e.g., a vertex outside of the current set). The boundary vertices can include vertices of the current set, vertices external to the current set, or both. Thus, as an example, where the threshold distance is zero, only internal vertices directly sharing an edge with an external vertex, or only external vertices directly sharing an edge with an internal vertex, are considered boundary vertices. For purposes of this example, these threshold=0 vertices are a first set of boundary vertices. To expand the example, if the threshold distance is one, the first set of vertices, as well as internal vertices or external vertices directly sharing an edge with a vertex of the first set are considered boundary vertices, and so on. It should be appreciated that any suitable combination of internal and external vertices, at various threshold boundaries, can be included in a particular boundary set. For instance, external and internal vertices of the first set, but only internal vertices of the second set, can be specified as boundary vertices. It should also be appreciated that the threshold distance can comprise any suitable distance value, so long as at least one vertex of a current set is excluded from the set of boundary vertices.

According to still other aspects of the subject disclosure, provided is a mechanism for evolving sets of analyzed vertices by coupling a random walk with the evolving set process. The coupling comprises determining subsequent sets of the process based on a random walk from a vertex (or set of vertices) of a current set. Subsequent sets can be expanded or contracted based on results of the random walk. Boundary vertices are re-determined for a subsequent set, and conductance of the subsequent set is determined from analysis of the boundary vertices.

It should be appreciated that, as described herein, the claimed subject matter can be implemented as a method apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card stick, key drive . . . ). Additionally it should be appreciated that a carrier wave can be employed to carry computer-readable electronic data such as those used in transmitting and receiving electronic mail or in accessing a network such as the Internet or a local area net work (LAN). The aforementioned carrier wave, in conjunction with transmission or reception hardware and/or software, can also provide control of a compiler to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations That is, if X employs A; X employs B; or X employs both A and B, then "X employs A or B" is satisfied under any of the foregoing in stances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, anchor user from a set of observations as captured via events and/or data. Inference can be employed to identify a specific context or action, or can generate a probability distribution over states, for example. The inference can be probabilistic—that is, the computation of a probability distribution over states of interest based on a consideration of data and events Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the figures, FIG. 1 depicts a block diagram of an example system 100 that provides targeted local partitioning of a graph according to aspects of the subject disclosure. System 100 comprises a graph partitioning system 102 that can receive as inputs 106 a graph G comprising a set of vertices V and edges E, and a starting point of interest within the graph G (e.g., the starting point comprising a set of starting vertices). Graph partitioning system 102 can then determine a cluster (or set) C of the vertices V pertinent to the starting point and export vertices (and optionally edges) of the set C as output 114. Pertinence to the starting point, as utilized here in, refers to a set of vertices connected with the starting point directly (by a single edge) or indirectly (by multiple edges and at least one other vertex), and having relatively low conductance $\Phi(C)$ as compared with other sets of vertices of G, where conductance $$\Phi(C) = \frac{e(C, V \setminus C)}{\text{vol}(C)} = \text{fraction of edges of } C$$

directly connected to vertices outside of C (or edges of C that go to V\C), where $e(C, V\setminus C)$=is the number of edges directly connecting vertices within C and vertices external to C. According to some aspects, the running time of such a determination can be $1/\sqrt{\phi}*\text{vol}(C)$ (ignoring terms of polylog(n), where n is the number of vertices in the received graph), where vol (C)=the sum of the degrees of vertices in C, and where $\phi$ is a target conductance. Additionally, approximation quality $f(\phi)$ for the determination can be $\phi \to \phi^{1/2} \log^{1/2} n$, in at least some such aspects, as discussed below.

Graph partitioning system 102 comprises a parsing component 104 that receives input data. The parsing component 104 can distinguish types of input data for analysis and storage by graph partitioning system 102. Specifically, parsing component 104 can distinguish vertices and edges of an input graph. Additionally, the parsing component 104 can distinguish a set of vertices entered as starting vertices from other vertices of the graph. Distinction can be by explicit coding or formatting of the input data, the parsing component 104 being configured to recognize such code or format. Additionally, distinction can be by metadata tags or labels, identifying portions of input data as distinct vertices, distinct edges, or distinct starting vertices and edges. Other suitable mechanisms for parsing input data can be utilized by parsing component 104.

Input data can be saved by parsing component 104 into memory 108. The data can be saved as received, or in distinct sets of data (e.g., comprising graph edges, graph vertices or starting vertices and edges) generated by parsing component 104. Additionally, parsing component 104 can provide an identified starting set of an input graph to a set of processors 112. Processor(s) 112 can employ local partitioning instructions 110 stored in memory 108 to determine a segment of the graph pertinent to the starting set and having conductance below or equal to a threshold conductance. Processors) 112 can provide as output a set of vertices (optionally including edges of the output set, indicating connections between vertices thereof) of the graph that satisfies the threshold conductance. If no such set is found within the graph, processor(s) 112 can output a set of vertices pertinent to the starting set and having lowest conductance.

As mentioned above, the time to determine a pertinent set of vertices C of a graph V meeting the threshold conductance φ can be $1/\sqrt{\phi}*\text{vol}(C)$. Furthermore, graph partitioning system 102 can provide an approximation quality f(φ) if for any set C satisfying $\Phi(C) \leq \phi$ and $\text{vol}(C) \leq (\frac{2}{3})\text{vol}(G)$ there is a set of starting vertices v in C of volume at least $(\frac{1}{2})\text{vol}(C)$ for which processor(s) 112 can output a set S with $\phi(S) \leq f(\phi)$ (with probability at least ½). The above time to determine the pertinent vertices with threshold or lowest conductance can provide a significant reduction in processing time and processing resources as compared with other algorithms (e.g., see Appendix A), with good approximation quality $\phi \to \phi^{1/2} \log^{1/2} n$. In addition to the foregoing graph partitioning system 102 can find a balanced partition of an input graph without a starting set of vertices, by joining small portions thereof found by processor(s) 112 employing using random starting vertices determined from local partitioning instructions 110. In such case, the running time for a balanced portion of the graph can be as low as $m+n/\sqrt{\phi}$ with approximation quality as good as $\phi \to \sqrt{\phi}\sqrt{\log n}$.

Figure 2:
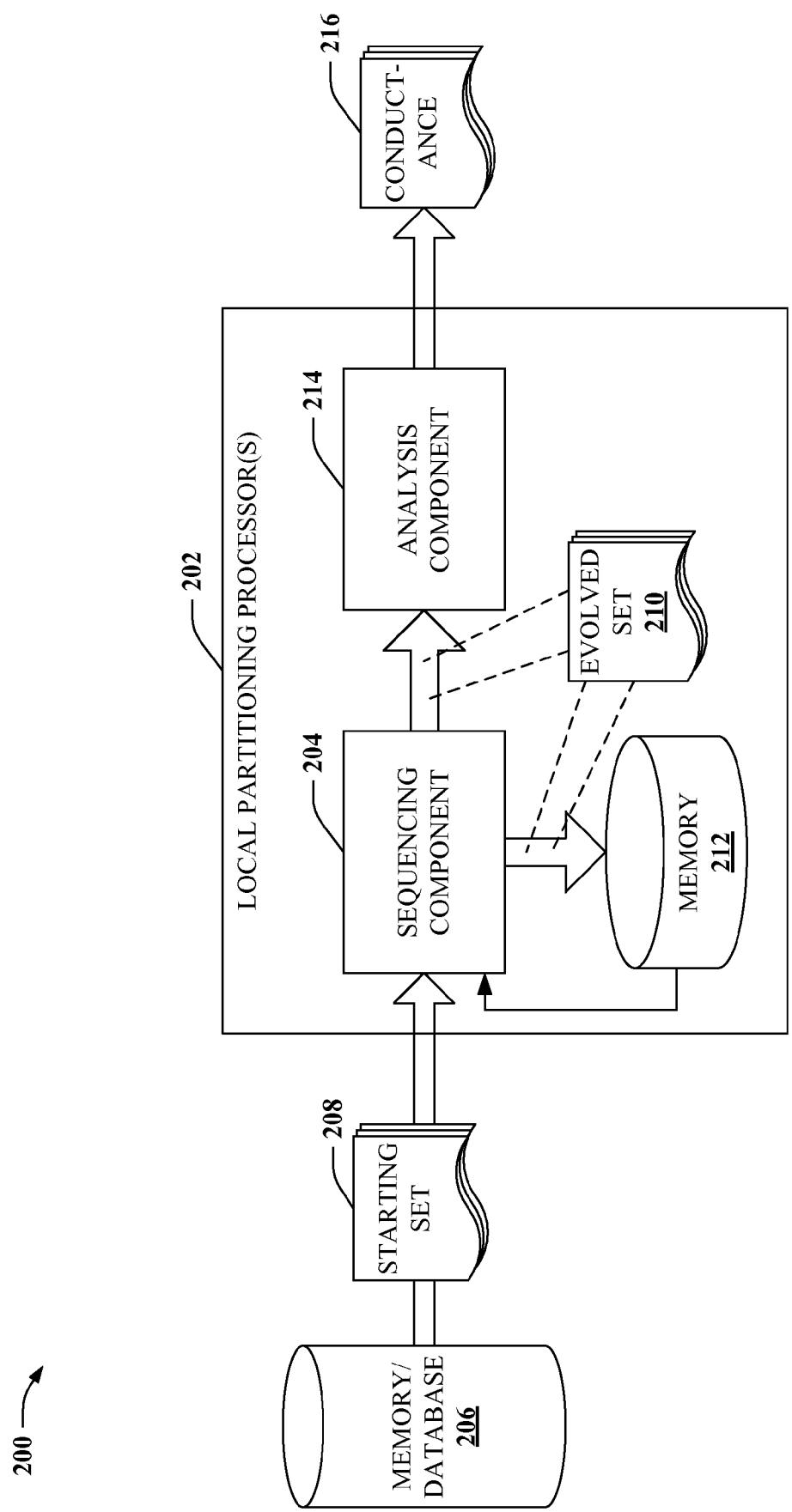
FIG. 2 illustrates a block diagram of a sample system for determining set conductance in a targeted graph partitioning system according to other aspects.

FIG. 2 depicts a block diagram of an example system 200 for analyzing a graph and identifying a portion of the graph pertinent to a starting set of vertices. Additionally, the system 200 can determine conductance of various pertinent portions of the graph, and output a portion meeting a threshold conductance or having lowest conductance. Such portion can be output from system 200, along with the vertices (optionally including edges) providing the threshold/lowest conductance.

System 200 can comprise a set of local partitioning processors 202 for analyzing sets of vertices and edges of a graph and determining conductance of such sets. A sequencing component 204 can obtain a graph as input (including all vertices and edges thereof). In some aspects, sequencing component 204 further obtains a starting set of vertices 208 of the graph from a memory or database 206. The sequencing component 204 evolves sets of the graph, beginning with the starting set 208, for examination by an analysis component 214. The sequence of evolving sets (210) can be written $S_0, S_1, S_2, \ldots, S_T$, where T is an integer and where $S_0$ is the starting set.

According to at least some aspects of the subject disclosure, the sequencing component 204 arrives at an evolved set $\tilde{S}$ from a current set S base don characteristics of boundary vertices of the current set. It should be appreciated that boundary vertices {u}, as described above, are a set of vertices of a graph sharing an edge with a vertex x of the set S (x∈S). These boundary vertices {u} can be directly connected with internal or external vertices of S, or connected indirectly within a distance threshold.

Characteristics of the boundary vertices {u} employed in transitioning from a current set S to a subsequent set $\tilde{S}$ can include vertex connectivity (a ratio of internal edges to external edges of a boundary vertex). In at least one aspect of the subject disclosure, evolution of the current set is based on probability of transitioning from a boundary vertex to an external vertex or internal vertex, based on the connectivity. This probability can be written as p(u, S)=the probability that a lazy random walk moves from boundary vertex u to a vertex v of the current set S. Mathematically, a lazy random walk on a graph G can be represented as $$p(u, v) = \frac{1}{2} \frac{1}{d(u)} \text{(if } \{u, v\} \in E\text{)}; \frac{1}{2} \text{(if } u = v\text{)};$$

and 0 otherwise. Given a current set S, the above probability of moving from vertex u to a vertex of set S can be written:

$$p(u, S) = \sum_{x \in S} p(u, x) = \frac{1}{2} \frac{e(u, S)}{d(u)} + \frac{1}{2} 1(u \in S).$$

Based on the above probability of transitioning from a boundary vertex of a current set S to another vertex within S, sequencing component 204 can derive a subsequent set $\tilde{S}=\{y: p(y, S) \geq U\}$, where U is selected randomly or pseudo-randomly (e.g., from a function providing an approximation of a random selection) from the interval [0,1]. Each instance of $\tilde{S}$ can be expanded or contracted to include subsequent sets of vertices satisfying the condition $p(y, S) \geq U$, for subsequent instances of U. This equality for generating $\tilde{S}$ can thus be utilized to provide the evolution of analyzed sets of a graph (e.g., $S_1, S_2, \ldots S_T$), based on a starting set 208.

As an alternative to the foregoing, sequencing component 204 can implement set evolution based on a combination of the evolving set process and a random walk, also referred to as a volume-biased evolving set process. According to such alternative implementation, a boundary vertex of a current set is identified, and its connectivity determined. A random walk is executed from the boundary vertex to an adjacent vertex. A subsequent set (e.g., $\tilde{S}$) is expanded to include the new vertex, if such vertex is outside the current set, or contracted to exclude the boundary vertex, if the adjacent vertex is within the current set. Mathematically, the combination of the random walk and evolving set process can be represented by defining a Markov chain having states comprising vertex-Set pairs $(X_t, S_t)$, where $X_t$ is a vertex and $S_t$ is a set. For the starting set, $X_0=x$ and $S_0=\{x\}$. For a particular current state $(X_{t-1}, S_{t-1})$, a new vertex is selected $X_t=x_t$ with probability $p(x_{t-1}, x_t)$, according to the random walk transition probabilities, outlined above.

The conductance of a set in the evolving set process can be related to a change in volume in a subsequent set by the folio wing propositions:

$$E_S\left(\mu(S_1) \middle| U \leq \frac{1}{2}\right) = \mu(S) + \partial(S) = \mu(S)(1 + \phi(S))$$

$$E_S\left(\mu(S_1) \middle| U > \frac{1}{2}\right) = \mu(S) - \partial(S) = \mu(S)(1 - \phi(S))$$

where U is a uniform random variable used to generate $S_1$ from S in the evolving set process. The growth gauge ψ(S) of a set S is defined by the following equation:

$$1 - \psi(S) := E_S \sqrt{\frac{\mu(S_1)}{\mu(S)}}$$

For a set $S \subseteq V$, the growth gauge and conductance satisfy $\psi(S) \geq \phi(S)^2/8$.

Based on the foregoing, where $\tilde{P}$ is the resulting transition properties, where $\tilde{P}_x(\bullet)=\tilde{P}(\bullet|x_0=x, S_0=\{x\})$, and where a volume-biased evolving set process is a Markov chain on subsets of V with a transition kernel defined as follows:

$$\hat{P}(S, S') = \frac{\mu(S')}{\mu(S)} P(S, S')$$

the folio wing propositions hold for any vertex x and time $t \geqq 0$:

$$\tilde{P}_x(X_1 = x_1, \ldots, X_t = x_t) = P_x(X_1 = x_1, \ldots, X_t = x_t)$$

$$\tilde{P}_x(S_1 = A_1, \ldots, S_t = A_t) = \hat{P}_x(S_1 = A_1, \ldots, S_t = A_t)$$

and $$\tilde{P}_x(X_t = x_t | S_1 = A_1, \ldots, S_t = A_t) = 1(x_t \in A_t) \frac{d(x_t)}{\text{vol}(A_t)}$$

Each instance of an evolved or subsequent set 210 can be saved in memory 212 (e.g., cache memory, random access memory, flash memory, disc storage, and so on) and provided to analysis component 214 (regardless of how the algorithm selected to generate the instance). The analysis component 214 can then evaluate the sets (210) and determine respective conductance thereof to identify. The respective conductances can be compared to a threshold conductance $\phi$, as a measure of the quality of such sets as partitions of the graph.

Determined conductance 216 of analyzed sets can be output from analysis component 214. Additionally, the local partitioning processor(s) 202 can output from memory 212 a set of vertices that corresponds with a particular conductance 216. In some aspects, a set is output only if its corresponding conductance 216 meets or drops below a conductance threshold $\phi$. In other aspects, where no set occurs having conductance equal to or less than $\phi$, system 200 can output a set having least conductance 216.

It should be appreciated that, according to some aspects of the subject disclosure, system 200 can comprise an independent system for evolving and analyzing sets of a graph relative a starting set 208, and outputting results of the analysis. In other aspects, system 200 can be coupled with a graph partitioning system (e.g., see FIG. 1, supra, or FIG. 3, infra) to receive a graph and generate as output a set of the graph that is pertinent to a starting set and has lowest/threshold conductance. In at least one aspect, such a graph partitioning system can generate a balanced cut (or portion) of the graph relative algorithmically determined starting sets and output the balanced cut and conductance 216.

Figure 3:
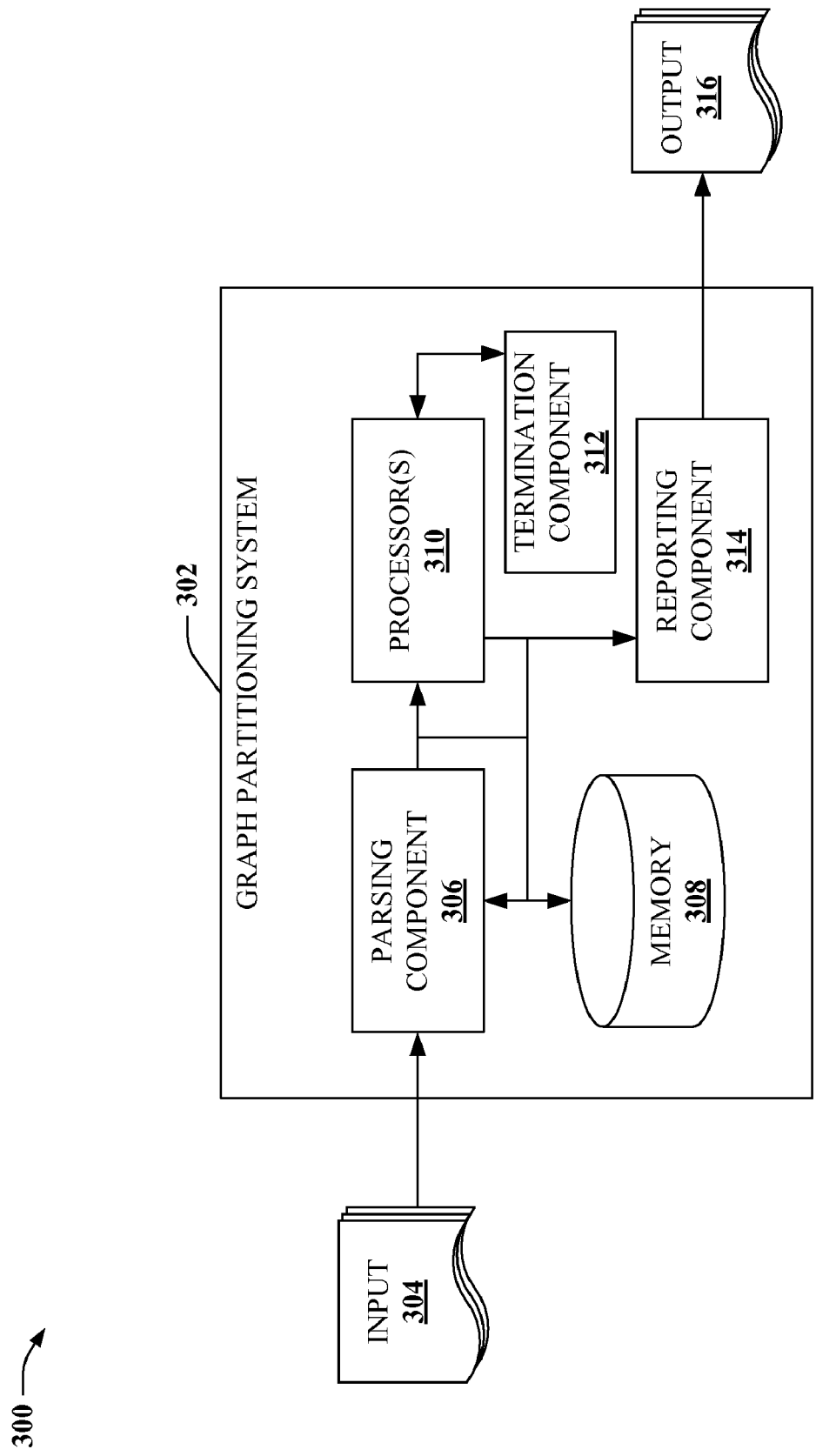
FIG. 3 depicts a block diagram of an example graph partitioning system for providing a local set of vertices pertinent to an input starting set of vertices.

FIG. 3 depicts a block diagram of an example system 300 according to aspects of the subject disclosure. System 300 can comprise a graph partitioning system 302 that receives as input 304 a graph for analysis and a starting vertex or set of vertices of interest. In feast some aspects of the subject disclosure, graph partitioning system 302 can further receive a target conductance $\phi$ with which to evaluate sets of the graph. As output 316, graph partitioning system 302 can provide a set of vertices of the graph that are pertinent to the starting vertex and meet a threshold conductance, or have lowest conductance.

Graph partitioning system 302 comprises a parsing component 306 that can distinguish data obtained from the input 304 into graph data, starting set data or target conductance data, and save the distinct data into memory 308. A set of processors 310 can analyze the data and can generate different sets of the graph for analysis. Generating set instances can be based on an evolving set process, a random or semi-random walk process (e.g., a lazy random walk), or both, as described herein. Additionally, the processor(s) 310 can determine conductance of respective sets of the graph, and compare the conductance with the threshold conductance (or a default conductance, see below). Conductance values of instances of analyzed sets can be saved in memory 308 associated with such instances. Processor(s) 310 can continue generating sets for analysis until the entire graph is suitably analyzed, or until a stop command is received from termination component 312.

Conductance values determined by the processor(s) 310 can be monitored by termination component 312. If a particular conductance value meets or drops below the target threshold, termination component 312 stops the analysis conducted by processor(s) 310, and instructs the processors) 310 to output the conductance to memory 308 or a reporting component 314. Reporting component 314 can obtain vertices (and optionally edges) of a set associated with the conductance, and output both the conductance and vertices as output 316. According to at least some aspects of the subject disclosure, termination component 312 can employ alternative or additional criteria for stopping analysis of the processor(s) 310. For instance, one alternative/additional criterion can comprise time reaching a stopping time T. Thus, if t=T, termination component 312 stops analysis of the graph and instructs the processors) 310 to save the current conductance in memory 308. The reporting component 314 obtains the set of vertices of the graph having lowest conductance from memory 308, and provides such set and lowest conductance as output 316. As another example of an alternative/additional stopping criterion, termination component 312 can employ a default threshold conductance. If an analyzed set is determined to have conductance that meets or falls below the default threshold conductance, termination component 312 can end the analysis, as above. In at least one aspect of the subject disclosure, the default threshold conductance can be equal to or substantially equal to $$\frac{20\sqrt{\ln n}}{T},$$

where n is the number of vertices in an input graph, and T is a default stop time.

Figure 4:
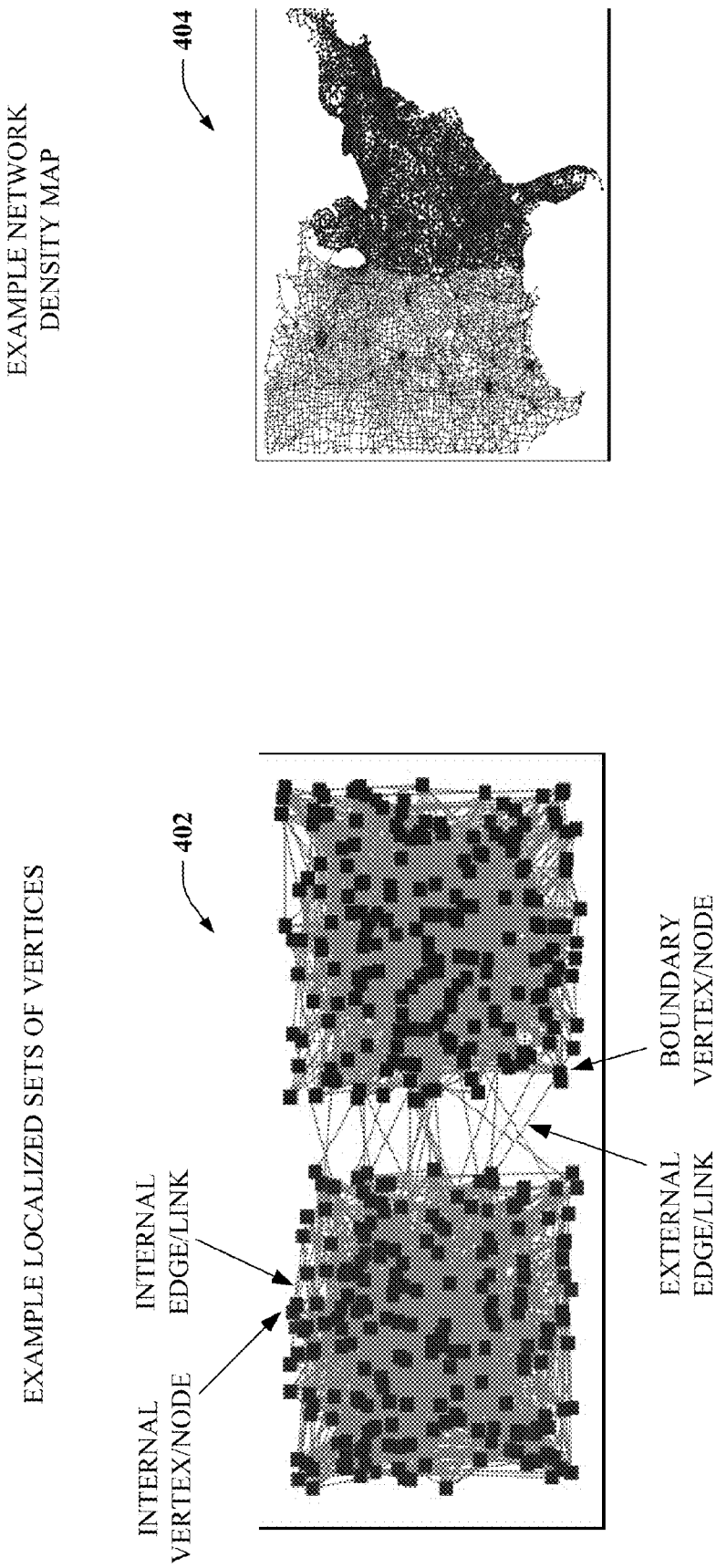
FIG. 4 illustrates a block diagram of example sets of localized vertices and network graphs according to aspects of the subject disclosure.

FIG. 4 depicts an example of local sets of vertices 402 of a graph representing nodes and connections of a national electronic communication network 404, according to aspects of the subject disclosure. The local sets of vertices 402 are sets (e.g., A and B) having relatively low conductance, and therefore the sets have more edges to other vertices within the respective sets as compared with edges to other vertices outside the respective sets. As depicted, an internal vertex or node associated with a set (e.g., A) shares edges only with one or more other vertices contained within the associated set. Thus, internal vertices are connected only with other internal vertices/nodes. Conversely, a vertex of one set (e.g., A) sharing an edge with a vertex not included within the one set is a boundary vertex/node, having at least one external edge/link. It should further be appreciated that the local sets 402 depicted at FIG. 4 are also separate sets, in that the respective sets do not share a common vertex.

In addition to the foregoing, an example network density map 404 is represented by a graph comprising computer network nodes as vertices of the graph and communication links between those nodes as edges of the graph. An arbitrary line is drawn to delineate one portion of the network (shaded dark) from a second portion (shaded light). In this case, localized sets of vertices (e.g., 402) might represent communication (links or edges) between sets of computers (nodes) of the network. In another example, the localized sets might represent sets of web pages (supported by server nodes) connected by hyperlinks. As another example, the graph could represent search queries and search results (nodes) connected by clicks, or selected results (edges). For yet another example, the graph could correspond to key words sponsored by search advertisers (at a set of server nodes) connected by keyword bids (edges). It should be appreciated that, as utilized herein, a graph can represent various categories of entities (nodes) and interactions between those categories of entities (edges). Local partitioning of such a graph, therefore, can be useful to determine subsets of the categorized entities having many inter-connections but relatively few external connections. These subsets can provide useful information pertaining the entities or categories discovered, or types of interconnections between them. As the number of nodes and edges in a graph increases (e.g., based on size or density of an under lying net work), set evolution or conductance analysis based on boundary vertices employed by local partitioning mechanisms disclosed herein can yield efficient results.

Figure 5:
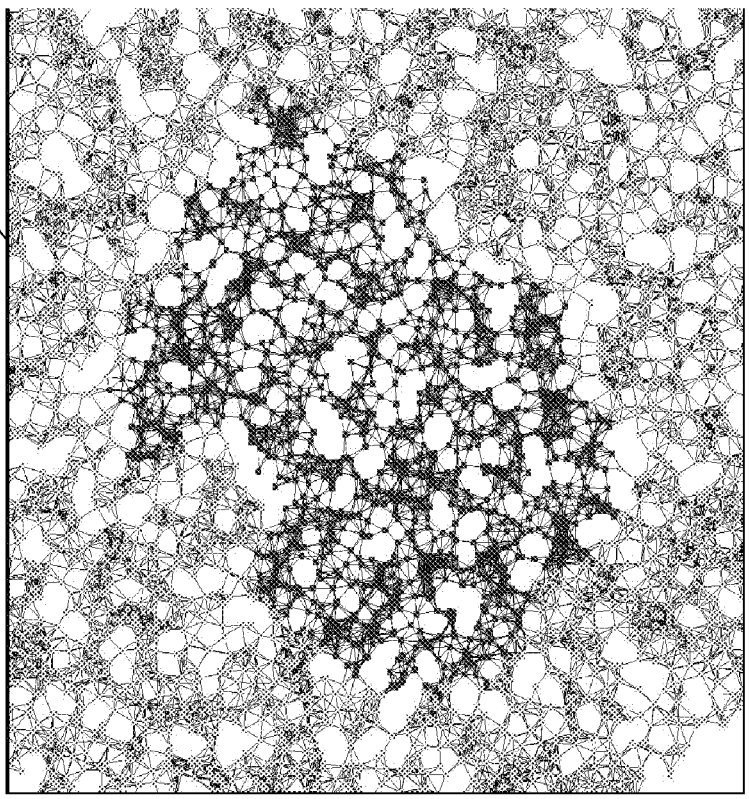
FIG. 5 depicts example targeted graph partitioning evolutions employing volume and boundary analysis according to other aspects of the subject disclosure.
Figure 5:
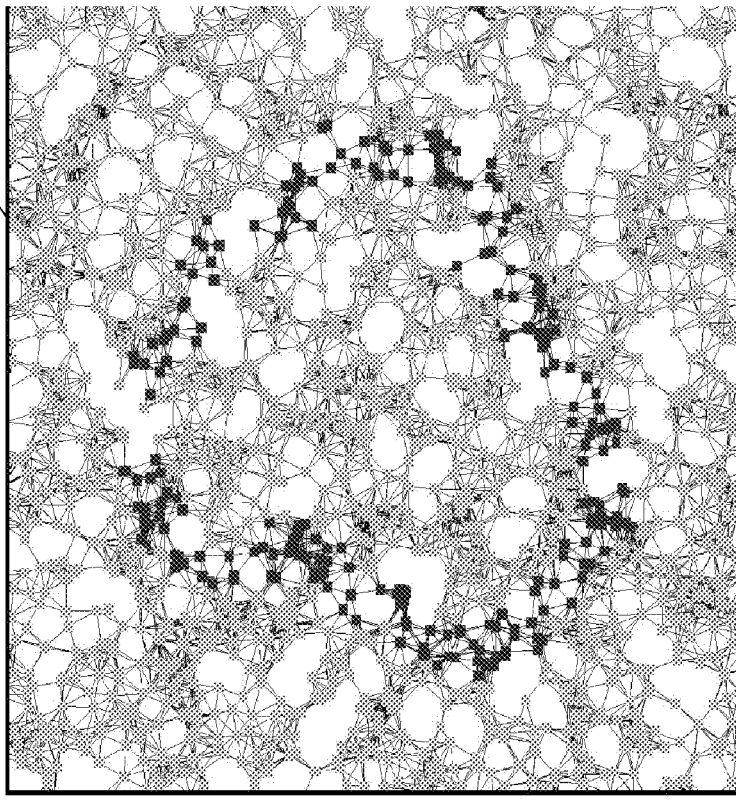

FIG. 5 illustrates ex ample graphs depicting distinction sin boundary analysis and volume analysis for targeted graph partitioning according to aspects of the subject disclosure. The boundary analysis example 502 depicts an analyzed set of vertices enclosed within the central shaded boundary region. As described herein, local partitioning analysis (e.g., set evolution or conductance) based on the boundary vertices (shaded vertices in 502) can be employed to identify localized portions of the graph (502). Note that this example (502) defines as boundary vertices only those internal vertices directly sharing an edge with a vertex outside the set, or vice versa. It should be appreciated that, in other examples, external or internal vertices indirectly sharing an edge with an internal or external vertex, respectively (e.g., by way of one or more other edges, or removed by one or more other vertices) can be defined as boundary vertices for purposes of the subject disclosure, if such external/internal vertices are within a threshold distance (e.g., threshold number of edges, or hops) to the corresponding internal/external vertex.

In contrast to the boundary analysis example 502, the volume analysis example 504 does not distinguish boundary vertices from non-boundary vertices of a set (all vertices within the central shaded region of 504). Regarding local partitioning, for instance, the volume analysis typically performs at least some calculations for each vertex of the set. Accordingly, significantly more processing can be required for the volume analysis 504 as opposed to the boundary analysis 502, especially as the respective sets become large. Accordingly, boundary analysis can provide a significant advantage in running time efficiency for set evolution and conductance determinations. When simulating a given step of the evolving set process, the boundary analysis is faster than volume analysis by the ratio of the volume of the set to the number of boundary vertices in the set, providing results significantly faster and utilizing significantly fewer processing resources.

Figure 6:
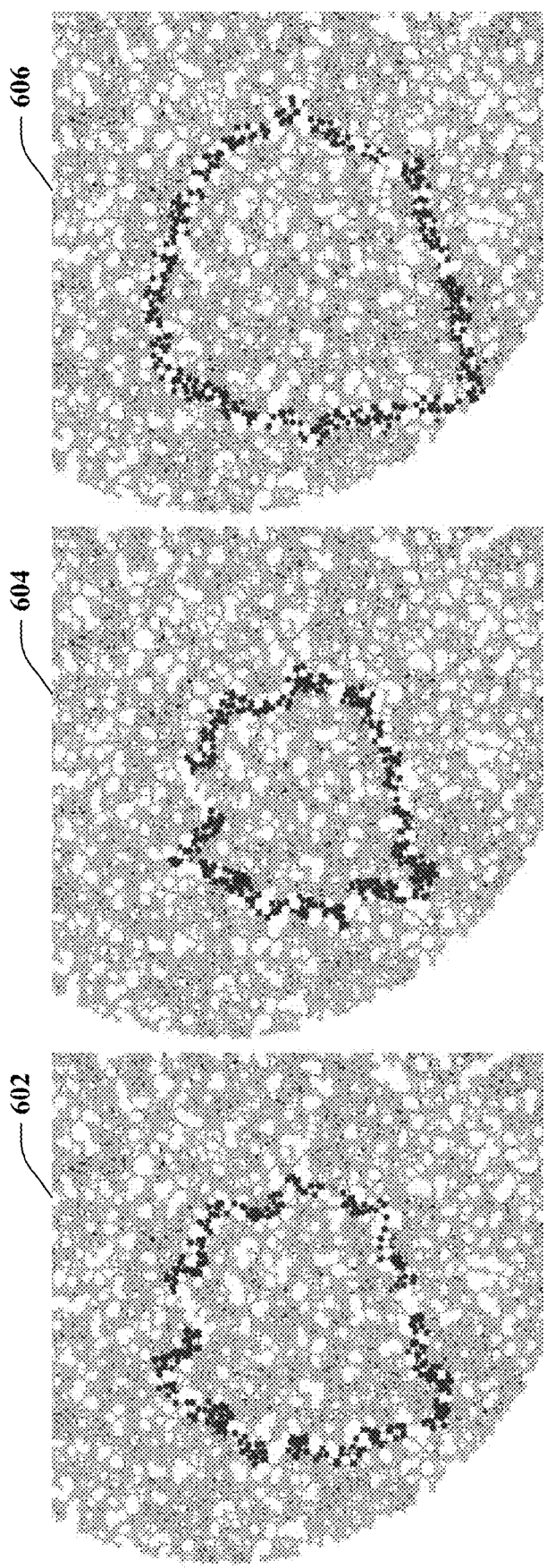
FIG. 6 illustrates a sample evolution of targeted graph partitioning based on evolution of an evolving set process according to still other aspects.

FIG. 6 depicts an example evolution of a set based on boundary analysis for local graph partitioning according to aspects of the subject disclosure. A current set 602 is based on 'X' iterations of boundary analysis (optionally initiated with a starting set of vertices), for example as described above with respect to local partitioning processor(s) 202 (FIG. 2, supra). As depicted at 604, the first set 602 transitions to a second set 604 after 'Y' additional iterations of the evolving set algorithms discussed above (e.g., the evolving set process algorithm $\tilde{S}=\{y: p(y, S) \geqq U\}$ for $U \in [0,1]$, or the volume-biased evolving set process as described at FIG. 2, supra). As depicted, the set 604 has contracted according to the above processes, for instance due to random selections of U, or due to probabilities provided by the random walk. At 606, a third set after 'X+Z' iteration s is depicted larger than the previous two sets 602, 604. In terms of boundary vertices (dark shaded vertices), processing overhead with respect to the third set 606 does not increase as much for boundary analysis as compared with volume analysis (e.g., see FIG. 5, supra), despite the significant increase in size of the third set 606, relative the first and second sets 602, 604. Accordingly, since the disclosed local partitioning algorithms for set evolution, conductance, or both, can be determined based on boundary analysis, significant efficiency can be gained both in generating possible set instances and in determining the conductance thereof.

The aforementioned systems have been described with respect to interaction between several components. It should be appreciated that such systems and components can include those components or sub-components specified therein, some of the specified components or sub-components, and/or additional components. For example, a system could include graph partitioning system 102, sequencing component 204, and analysis component 214, or a different combination of these and other components. Sub-components could also be implemented as components communicatively coupled to other components rather than included within parent components. Additionally, it should be noted that one or more components could be combined into a single component providing aggregate functionality. For instance, termination component 312 can include reporting component 314, or vice versa, to facilitate terminating targeted partitioning analysis and output ting results of the analysis by way of a single component. The components may also interact with one or more other components not specifically described herein bit known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural net works, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
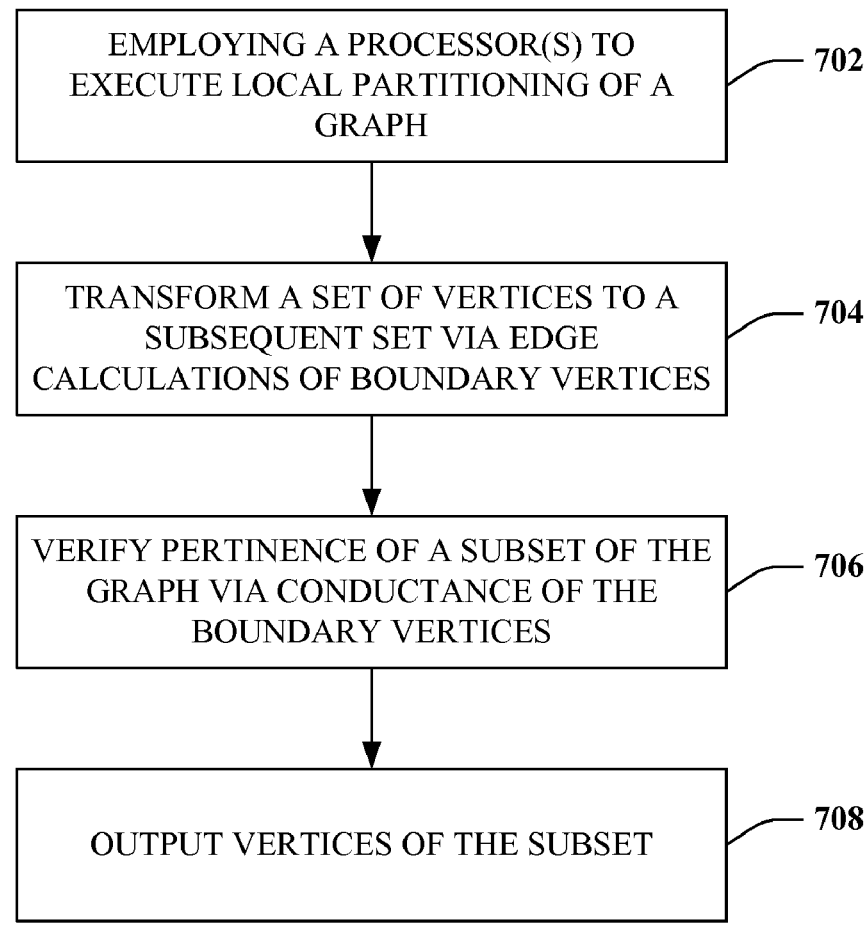
FIG. 7 depicts a flowchart of an example methodology for targeted graph partitioning according to one or more aspects disclosed herein.
Figure 8:
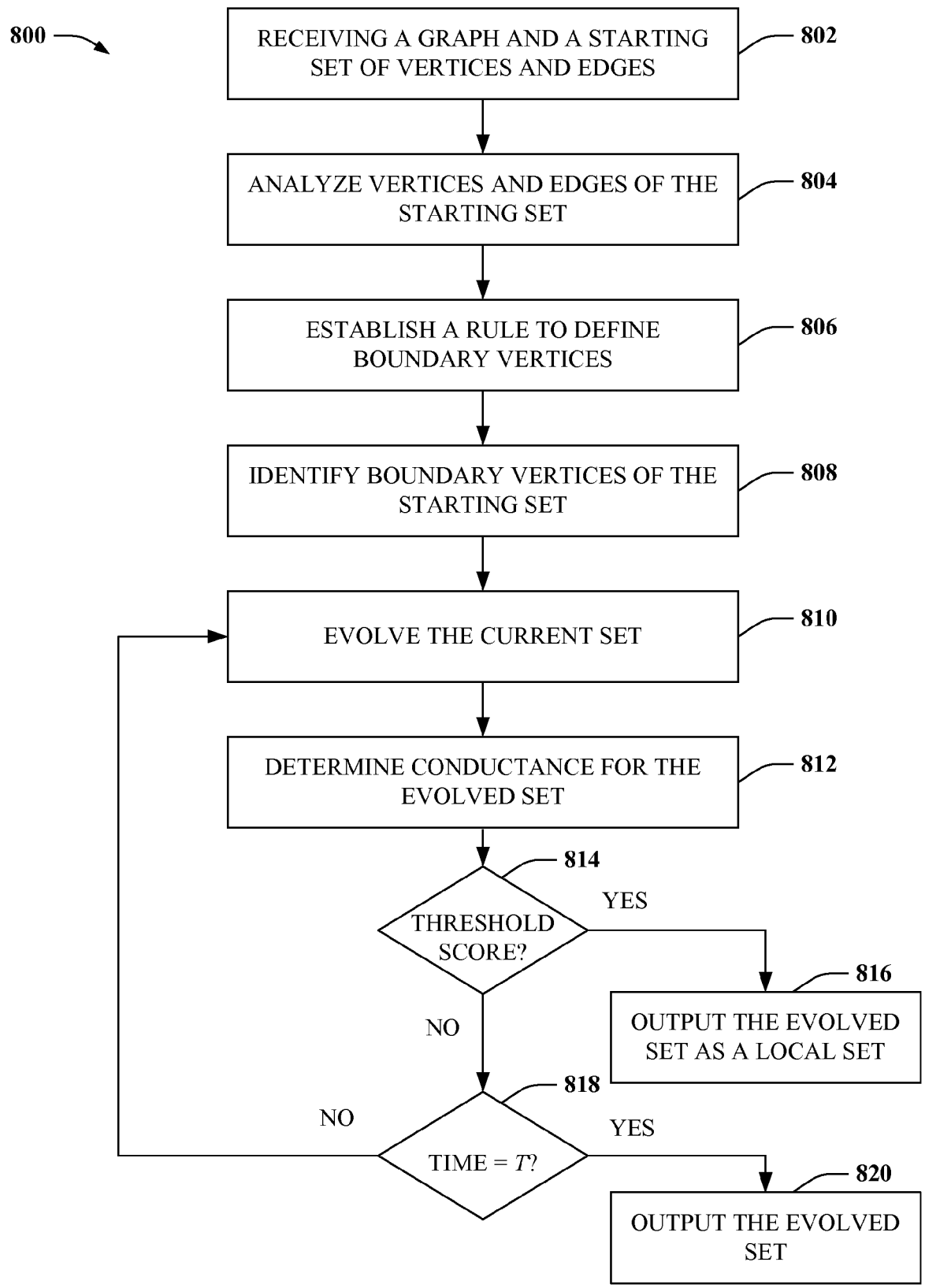
FIG. 8 illustrates a flowchart of a sample methodology for employing an evolving set process based on boundary analysis in targeted graph partitioning

In view of the exemplary systems described supra, methodologies that may be implemented in accordance with the disclosed subject matter will be better appreciated with reference to the flow charts of FIGS. 7-8. While for purposes of simplicity of explanation, the methodologies are shown and described as a series of blocks, it is to be under stood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed herein after and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

FIG. 7 depicts a flowchart of an example methodology for providing localized graph partitioning according to one or more aspects of the subject disclosure. At 702, method 700 can employ a set of processors to execute local partitioning of a graph. The graph can comprise a set of vertices and edges. Additionally, the graph can be employed as a mathematical abstraction of various macroscopic entities and interactions, such as communications between nodes of an electronic network, parallel processing involving shared tasks and common data dependencies, search-selection analysis, keyword-bid analysis for advertising keywords, and so forth. By analyzing the mathematical abstraction, analysis of the under tying entities and interactions is possible.

At 704, method 700 can transform a set of vertices to a subsequent set based on characteristics of vertices at a boundary of the set. In some aspects, the characteristics can comprise connectivity of a boundary vertex, connectivity being based on a ratio of internal edges to external edges. In other aspects, the characteristics can comprise a random walk executed at the vertex. It should be appreciated that boundary vertices can be vertices internal to the set directly sharing an edge with an external vertex, or vice versa. Additionally, the boundary vertices can be internal vertices indirectly sharing such an edge with the external vertex (e.g., via one or more other edges), or vice versa.

At 706, method 700 can verify pertinence of a subset of the graph via conductance analysis of the boundary vertices. For instance, a threshold conductance can represent a desired pertinence to a starting vertex (or set of vertices). If the conductance of a current set meets or drops below the threshold conductance, the pertinence is verified. At 708, method 700 can output vertices of the subset having verified pertinence.

FIG. 8 illustrates a flowchart of an example methodology 800 for employing an evolving set process based on boundary analysis in targeted graph partitioning. At 802, method 800 can receive a graph and a starting set of vertices (optionally including edges) of the graph. At 804, method 800 can analyze the vertices and/or edges of the starting set. Analysis can be, for instance, to determine conductance of the starting set. In another instance, analysis can be to determine connectivity of the starting set or number of external vertices sharing an edge with the starting set, and so forth.

At 806, method 800 can establish a rule for defining boundary vertices for targeted graph partitioning. The rule can establish, for instance, a maximum number of edges to connect an internal or external vertex with a corresponding external/internal vertex, respectively, to qualify as a boundary vertex. At 808, method 800 can identify boundary vertices of the starting set, based on the established rule. At 810, method 800 can evolve the current set to a subsequent set. Evolution of the current set can be based at least in part on characteristics of the boundary vertices. In at least one aspect, evolution can be implemented via an evolved set process algorithm, or a volume-biased evolving set process algorithm (e.g., combining a random walk with the evolving set process).

At 812, method 800 can determine conductance for the evolved set. At 814, a determination is made as to whether the conductance meets a threshold score. If so, method 800 can proceed to 816, where the evolved set and determined conductance are output as a focal set meeting the desired threshold. Otherwise, method 800 proceeds to 818, where a second determination is made as to whether a time, t, has reached a stop time T. If so, method 800 proceeds to 820 where the evolved set is output as failing to meet the threshold conductance. Otherwise, method 800 returns to 810 to further evolve the evolved set.

Figure 9:
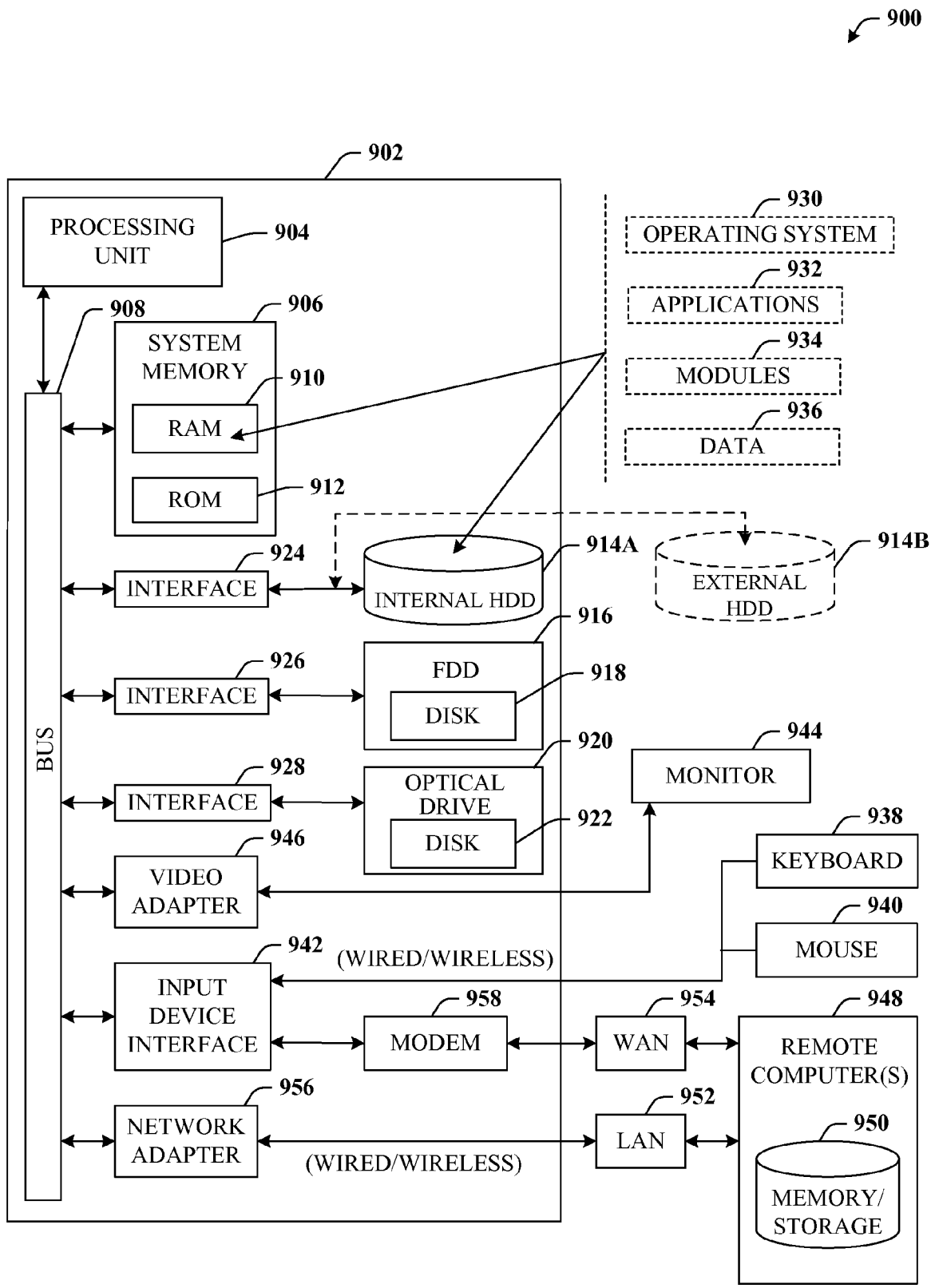
FIG. 9 depicts a block diagram of an example operating environment for processing targeted graph partitioning instructions according to disclosed aspects.

Referring now to FIG. 9, there is illustrated a block diagram of an exemplary computer system operable to compile and graphically rendering user context or sentiment information according to aspects of the disclosure, as well as execute other aspects of the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter described above can be suitable for application in the general context of computer-executable instructions that can run on one or more computers, the claimed subject matter also can be implemented in combination with other program modules and/or as a combination of hardware and soft ware.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the compiler, and includes both volatile and nonvolatile media, removable and non-removable media. By way of example, and not limitation, computer-readable media can comprise computer storage media and communication media. Compiler storage media can include both volatile and nonvolatile, removable and non-removable media implemented in any method or technology for storage of information such as compiler-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 9, the exemplary environment 900 for implementing various aspects of the claimed subject matter includes a computer 902, the computer 902 including a processing unit 904, a system memory 906 and a system bus 908. The system bus 908 couples system components including, but not limited to, the system memory 906 and the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914A (e.g., EIDE, SAT A), which internal hard disk drive 914A can also be configured for external use (1014B) in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject matter claimed here in.

The drives and their associated computer-readable media provide nonvolatile storage of data, data structures, computer-executable instructions, and so forth. For the compiler 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain compiler-executable instructions for performing the methods of the claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wire less input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 anchor larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN net working environment, the computer 902 can include a modem 958, can be connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be store din the remote memory/storage device 950. It will be appreciated that the network connections shown are exemplary and other means of establishing a communications link between the computers can be used.

The computer 902 is operable to communicate with any wireless devices or entities operatively disposed in wire less communication, e.g., a printer, scanner, desktop and/or portable computer, portable data assistant, communications satellite, any piece of equipment or location associated with a wirelessly detectable tag(e.g., a kiosk, news stand, restroom), and telephone. This includes at least WiFi and Bluetooth™ wireless technologies. Thus, the communication can be a predefined structure as with a conventional net work or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, within wireless communication range of a base station. WiFi networks use radio technologies called IEEE802.11 (a, b, g, n, etc.) to provide secure, reliable, fast wireless connectivity. A WiFi net work c an be used to connect computers to each other, to the Internet, and to wired networks (which use IEEE802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9 BaseT wired Ethernet networks used in many offices.

Figure 10:
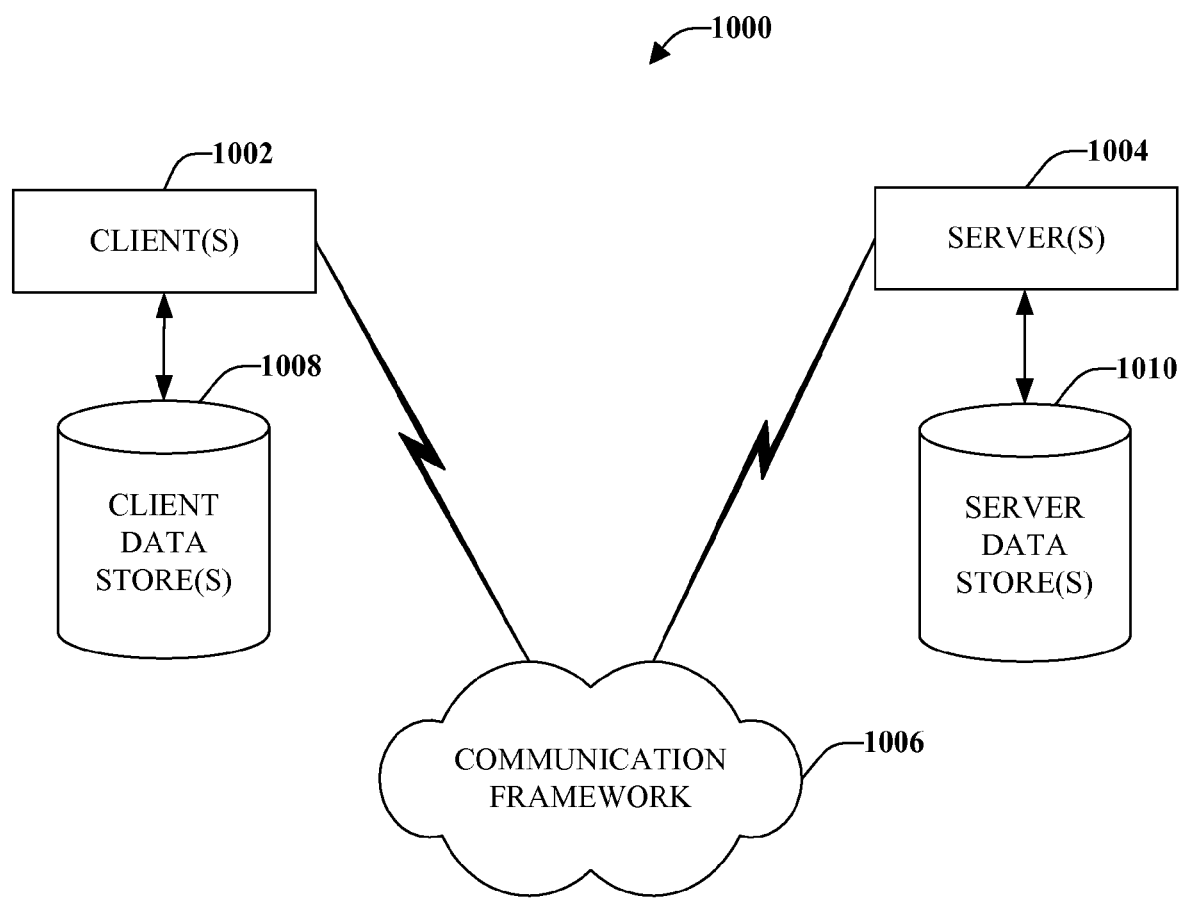
FIG. 10 illustrates a block diagram of an example networking environment for conducting remote processing of data according to at least one disclosed aspect.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or soft ware (e.g., threads, processes, computing devices). The client(s) 1002 can house cookie(s) and/or associated contextual information by employing the claimed subject matter, for example.

The system 1000 also includes one or more server(s) 1004. The servers) 1004 can also be hardware and/or software (e.g., threads, processes, compiling devices). The servers 1004 can house threads to perform transformations by employing the claimed subject matter, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the servers) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the servers) 1004 are operatively connected to one or more server data store(s) 1010 that can be employed to store information local to the servers 1004.

Also included as part of the subject disclosure is Appendix A and Appendix B.

What has been described above includes examples of the various embodiments. It is, of course, not possible to describe every conceivable combination of components or methodologies for purposes of describing the embodiments, but one of ordinary skill in the art can recognize that many further combinations and permutations are possible. Accordingly, the detailed description is intended to embrace all such alterations, modifications, and variations that fall within the sp hit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature can be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for targeted partitioning of a graph, comprising:
   memory for storing instructions for partitioning the graph; and
   at least one processor to execute the instructions to determine conductance of a subset of the graph;
   a sequencing component, stored in the memory and executable by the at least one processor, to evolve a current set of vertices by expanding or contracting the current set based on a number of edges of one or more boundary vertices, the one or more boundary vertices comprising a subset of the vertices of the current set that are within a minimum distance to a boundary of the current set; and
   an analysis component, stored in the memory and executable by the at least one processor, to determine a conductance of the current set and terminate the evolution when the conductance of the current set is equal to or less than a threshold.

2. The system of claim 1, wherein the system is configured to receive the graph and a starting set of vertices as input to initiate execution of the instructions, the one or more boundary vertices do not include at least one starting vertex.

3. The system of claim 1, wherein the sequencing component is configured to employ a starting set of vertices to initiate the current set and an evolving set algorithm to evolve the current set.

4. The system of claim 3, wherein the evolving set algorithm is configured to expand or contract the current set based on connectivity of at least one boundary vertex with the current set.

5. The system of claim 4, wherein the connectivity is a function of a number of common edges between the at least one boundary vertex and vertices within the current set.

6. The system of claim 3, wherein the evolving set algorithm is configured to expand or contract the current set independent of characteristics of non-boundary vertices of the current set.

7. The system of claim 3, wherein the evolving set algorithm is configured to expand the current set to include a vertex having transition probability greater than or equal to a random or quasi-random number.

8. The system of claim 3, wherein the evolving set algorithm is configured to employ a new random or quasi-random number for expanding or contracting the current set at each evolution thereof.

9. The system of claim 3, wherein the evolving set algorithm is of a form:

$$\tilde{S} = \{y: p(y,S) \geq U\}$$

where S is the current set, $\tilde{S}$ is a next set, U is a random or semi-random number, and y is a boundary vertex.

10. The system of claim 9, where p(y,S) is a probability that a lazy walk transitions from vertex y to S and is of the form:

$$p(y, S) = \sum_{x \in S} p(u, x) = \frac{1}{2} \frac{e(u, S)}{d(u)} + \frac{1}{2} 1(u \in S)$$

where u is a vertex of the graph, and x is a vertex of the current set S.

11. The system of claim 9, wherein the evolving set algorithm is configured to update the current set S to a new set S' based on a random walk from vertex X to vertex X' such that U∈[0,1] if X'∈S', where X is a vertex of the set S and X' is a vertex sharing an edge with X.

12. The system of claim 1, wherein the analysis component is configured to determine conductance based on a ratio of number of edges that extend out of the current set to number of edges contained within the current set.

13. The system of claim 1, wherein the analysis component is configured to employ an algorithm of the following form to determine conductance of the current set φ(S):

$$\phi(S) = \frac{e(S, V \setminus S)}{\text{vol}(S)} = \text{the fraction of edges from } S \text{ that go to } V \setminus S$$

where V\S=all vertices in the graph excluding vertices in the current set S, and vol(S)=Volume of S=sum of the degrees of vertices in S.

14. The system of claim 1, further comprising at least one of:
a termination component to stop execution of the instructions if:
the conductance of S satisfies $$\phi(S) < \frac{20\sqrt{\ln n}}{T},$$

where n is a number of vertices in the graph and T is a maximum processing time; or
time t=T; or
a reporting component outputs vertices of the current set S at time t.

15. A computer-executable method for targeted partitioning of a graph, comprising:
employing at least one processor for executing local partitioning instructions to identify a subset of the graph pertinent to a starting set, the instructions comprising:
transforming a current set of vertices of the graph to a subsequent set as a function of edge calculations of boundary vertices of the current set, the boundary vertices comprising a subset of the vertices of the current set at a boundary of the current set; and
verifying that vertices of the current set comprise a pertinent subset of the graph if conductance of the boundary vertices meets a threshold conductance; and
outputting vertices of the pertinent subset from the at least one processor.

16. The method of claim 15, further comprising terminating execution of the local partitioning instructions when time t equals a threshold time T, or when conductance of the boundary vertices is equal to or less than the threshold conductance.

17. The method of claim 15, wherein the transforming the current set further comprises expanding or contracting the current set based on a number of edges of at least one boundary vertex.

18. The method of claim 15, wherein the transforming the current set further comprises executing a random walk from a boundary vertex to a vertex X' sharing an edge with the boundary vertex, and at least one of:
contracting the current set if X'∈S; or
expanding the current set if X'∉S.

19. The method of claim 15, wherein the boundary vertices comprise vertices of the current set that are separated from an external vertex by less than n edges, where the external vertex is outside the current set and shares an edge with a vertex of the current set, and where n is an integer greater than zero and less than the fewest number of edges separating the external vertex from a vertex of the starting set.

20. A graph partitioning system for targeted partitioning of a graph comprising vertices and edges, the system comprising:
memory for storing instructions for partitioning the graph; and
at least one processor to execute the instructions to determine conductance of a subset of the graph;
a sequencing component, stored in the memory and executable by the at least one processor, to evolve a current set of vertices by expanding or contracting the current set based on a number of edges of one or more boundary vertices, the boundary vertices comprising a subset of the vertices of the current set at a boundary of the current set;
an analysis component, stored in the memory and executable by the at least one processor, to determine a conductance of the current set and terminate the evolution if the conductance of the current set is equal to or less than a threshold;
a termination component, stored in the memory and executable by the at least one processor, to stop execution of the instructions if time t is equal to a maximum run time T, or upon the conductance of the current set dropping below the threshold; and
a reporting component, stored in the memory and executable by the at least one processor, to output the vertices of the current set.

* * * * *

UNITED STATES PATENT AND TRADEMARK OFFICE
CERTIFICATE OF CORRECTION

PATENT NO. : 8,364,615 B2
APPLICATION NO. : 12/367404
DATED : January 29, 2013
INVENTOR(S) : Andersen et al.

It is certified that error appears in the above-identified patent and that said Letters Patent is hereby corrected as shown below:

In the Specification

Column 1, line 36, delete "compiler" and insert -- computer --, therefor.

Column 1, line 40, delete "ex ample," and insert -- example, --, therefor.

Column 1, line 41, delete "compiler" and insert -- computer --, therefor.

Column 1, line 60, delete "under tying" and insert -- underlying --, therefor.

Column 2, line 6, delete "focal" and insert -- local --, therefor.

Column 3, line 51, delete "soft ware" and insert -- software --, therefor.

Column 3, line 51, delete "bit" and insert -- but --, therefor.

Column 3, line 54, delete "pro gram," and insert -- program, --, therefor.

Column 3, line 58, delete "localize don" and insert -- localized on --, therefor.

Column 4, line 3, delete "partitioning" and insert -- partitioning, --, therefor.

Column 4, line 4, delete "hand" and insert -- hand, --, therefor.

Column 4, line 8, delete "clustering" and insert -- clustering, --, therefor.

Column 4, line 26, delete "partitioning" and insert -- partitioning, --, therefor.

Column 4, lines 33-34, delete "algorithm scan" and insert -- algorithms can --, therefor.

Column 4, line 36, delete "under tying" and insert -- underlying --, therefor.

Column 4, line 42, delete "here in," and insert -- herein, --, therefor.

Column 4, line 53, delete "feast" and insert -- least --, therefor.

Column 5, line 25, delete "method" and insert -- method, --, therefor.

Column 5, line 41, delete "net work" and insert -- network --, therefor.

Column 5, lines 43-44, delete "compiler" and insert -- computer --, therefor.

Column 5, line 60, delete "in stances." and insert -- instances. --, therefor.

Column 5, line 67, delete "anchor" and insert -- and/or --, therefor.

Signed and Sealed this
Seventeenth Day of February, 2015

Michelle K. Lee
*Deputy Director of the United States Patent and Trademark Office*

CERTIFICATE OF CORRECTION (continued)
U.S. Pat. No. 8,364,615 B2

Column 6, line 26, delete "here in," and insert -- herein, --, therefor.

Column 7, line 3, delete "processors)" and insert -- processor(s) --, therefor.

Column 7, line 53, delete "base don" and insert -- based on --, therefor.

Column 8, lines 47-48, delete "folio wing" and insert -- following --, therefor.

Column 9, line 11, delete "folio wing" and insert -- following --, therefor.

Column 9, line 57, delete "feast" and insert -- least --, therefor.

Column 10, line 18, delete "processors)" and insert -- processor(s) --, therefor.

Column 10, line 29, delete "processors)" and insert -- processor(s) --, therefor.

Column 10, lines 56-57, delete "no de" and insert -- node --, therefor.

Column 11, line 12, delete "key words" and insert -- keywords --, therefor.

Column 11, lines 23-24, delete "under lying net work" and insert -- underlying network --, therefor.

Column 11, line 27, delete "ex ample" and insert -- example --, therefor.

Column 11, line 27, delete "distinction sin" and insert -- distinctions in --, therefor.

Column 12, line 10, delete "iteration s" and insert -- iterations --, therefor.

Column 12, line 10, delete "depicted" and insert -- depicted, --, therefor.

Column 12, line 38, delete "output ting" and insert -- outputting --, therefor.

Column 12, line 40, delete "bit" and insert -- but --, therefor.

Column 12, line 47, delete "net works" and insert -- networks --, therefor.

Column 12, line 58, delete "under stood" and insert -- understood --, therefor.

Column 13, line 16, delete "under tying" and insert -- underlying --, therefor.

Column 13, line 65, delete "focal" and insert -- local --, therefor.

Column 14, line 21, delete "soft ware" and insert -- software --, therefor.

Column 14, line 42, delete "compiler," and insert -- computer, --, therefor.

Column 14, line 46, delete "Compiler" and insert -- Computer --, therefor.

Column 14, line 49, delete "compiler" and insert -- computer --, therefor.

Column 15, line 41, delete "here in." and insert -- herein. --, therefor.

Column 15, line 44, delete "compiler" and insert -- computer --, therefor.

Column 15, line 54, delete "compiler" and insert -- computer --, therefor.

Column 16, line 24, delete "anchor" and insert -- and/or --, therefor.

Column 16, line 37, delete "net working" and insert -- networking --, therefor.

Column 16, line 45, delete "store din" and insert -- stored in --, therefor.

Column 17, line 13, delete "soft ware" and insert -- software --, therefor.

Column 17, line 18, delete "servers)" and insert -- server(s) --, therefor.

Column 17, line 19, delete "compiler" and insert -- computer --, therefor.

CERTIFICATE OF CORRECTION (continued)
U.S. Pat. No. 8,364,615 B2

Column 17, line 29, delete "servers)" and insert -- server(s) --, therefor.

Column 17, line 35, delete "servers)" and insert -- server(s) --, therefor.

Column 17, line 47, delete "sp hit" and insert -- spirit --, therefor.